March 28, 1933.  R. SCHIAVULLI  1,903,271
SPRING SHACKLE
Filed May 13, 1931
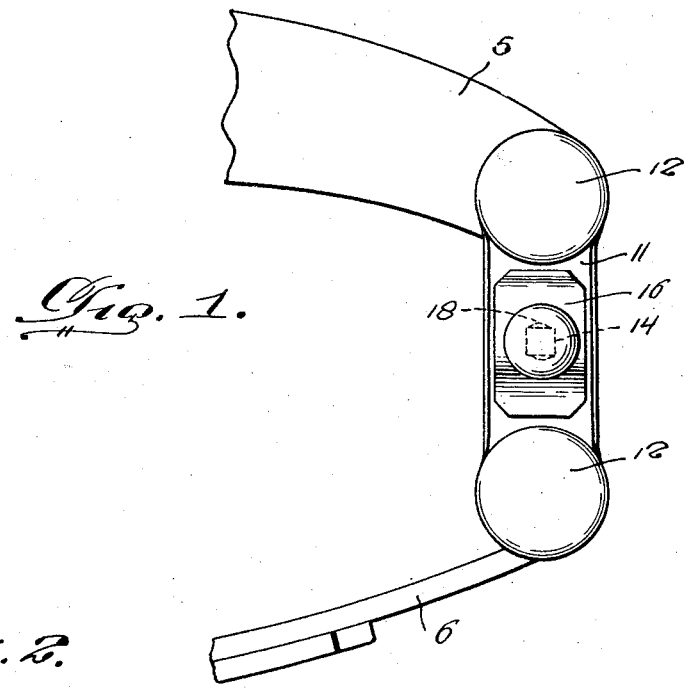
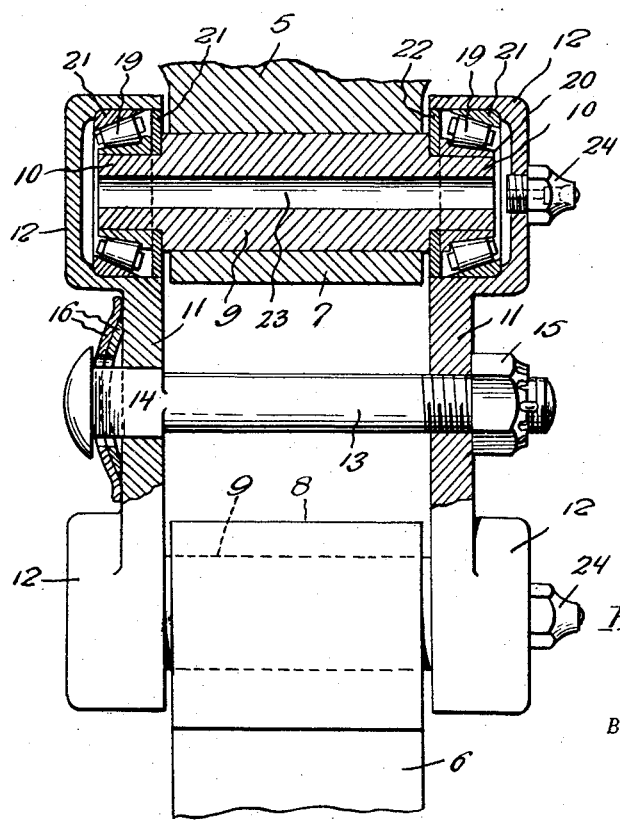
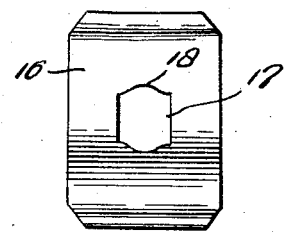
Rudolph Schiavulli
INVENTOR.
BY J. Stanley Burch
ATTORNEY.

Patented Mar. 28, 1933

1,903,271

UNITED STATES PATENT OFFICE

RUDOLPH SCHIAVULLI, OF PROVIDENCE, RHODE ISLAND

SPRING SHACKLE

Application filed May 13, 1931. Serial No. 537,134.

This invention relates to improvements in spring shackles, and the primary object of the invention is to provide a simple and durable spring shackle which, when applied, will prevent binding, rattling and squeaking.

More specifically, the invention contemplates a spring shackle which may be readily and effectively lubricated, and wherein there will be a minimum amount of friction.

The invention consists in the novel form, combination and arrangement of parts hereinafter more fully described, shown in the accompanying drawing and claimed.

In the drawing:

Figure 1 is a fragmentary side elevational view, showing the adjacent ends of a vehicle spring and frame member connected by a shackle embodying the present invention.

Figure 2 is an enlarged view looking toward the left of Figure 1, with the upper portion of the shackle and the vehicle frame member broken away and in section; and Figure 3 is a plan view of one of the spring plates interposed between the head of the assembly bolt and the adjacent shackle plate of the device shown in Figures 1 and 2.

Referring more in detail to the drawing, 5 indicates the end of one side rail of a vehicle chassis frame, and 6 indicates the adjacent end of the vehicle spring, respectively provided with bearings 7 and 8.

Fitted and secured in the bearings 7 and 8 are shafts or spindles 9, each of which has its ends reduced as at 10. The larger intermediate portions of the spindles 9 are slightly longer than the bearings 7 and 8 to project at opposite sides of the latter for a purpose which will presently become apparent.

Shackle plates 11 are arranged at opposite sides of the bearings 7 and 8, and each shackle plate has at each end a cup-shaped portion 12 which fits over the reduced end 10 of the adjacent spindle 9. These shackle plates are held in place by means of a bolt 13 which passes through the two shackle plates at their centers or intermediate the bearings 7 and 8. One shackle plate 11 has an angular opening to receive the correspondingly shaped inner end portion 14 of the stem of the bolt 13, whereby the latter is prevented from turning when in place. A nut 15 is threaded upon the bolt at the opposite end from the head of the bolt, and placed on the polygonal inner end portion 14 of the bolt 13 between the head of the bolt and the outer side of the adjacent shackle plate 11 are curved outwardly bowed spring plates 16. In assembling the structure, the nut 15 is tightened sufficiently to place the spring plates 16 under proper tension so that the shackle plates are yieldingly engaged, indirectly, with the shoulders formed by reducing the ends of the spindles or shafts 9. As the engaged surfaces wear, the plates 11 will be automatically adjusted toward each other by the spring plates 16 so as to compensate for the wear and prevent objectionable rattling. As shown in Figure 3, the spring plates 16 have central polygonal openings 17 to fit the polygonal portion 14 of the stem of bolt 13 so that said spring plates will be maintained in proper position extending longitudinally of the shackle plates 11 as shown in Figure 2. It will be noted that the openings 17 of the spring plates 16 are elongated longitudinally of the latter as at 18 to prevent breaking of said spring plates when compressed toward a straight condition.

A roller bearing is arranged between each reduced portion 10 of each shaft 9 and the adjacent cup-shaped portion 12 of the associated shackle plate 11, the rollers 19 of said bearings being carried by suitable cages and arranged between inner and outer races 20 and 21. The inner race fits over the reduced end 10 of the associated spindle 9, and the outer race 21 fits within the adjacent cup-shaped portion 12 of the associated shackle plate 11. It will be seen that the rollers are tapered and arranged with their larger ends innermost so that when the shackle plates are drawn together the surfaces of the rollers and races are maintained engaged to prevent rattling. Should these surfaces wear slightly, the same will be automatically compensated for by movement of the plates 11 toward each other under the influence of the spring plates 16.

A suitable washer 22 is provided to close the inner side of each cup-shaped portion 12 so as to retain lubricant within the latter, said washer 22 being fitted on the adjacent reduced end 10 of the spindle 9 and arranged between the inner end of the adjacent inner race 20 and the annular shoulder formed by reducing the adjacent end of the spindle 9.

Each spindle or shaft 9 is provided with an axial bore 23 which opens through the ends of said spindle or shaft and communicates with the cup-shaped portions 12 of the shackle plates, 11 which fit over the reduced ends of said spindle or shaft. The cup-shaped portions 12 of one shackle plate 11 are provided with central openings in which are threaded the stems of conventional lubricating connections or nipples 24 adapted to cooperate with the nozzle of a grease gun or the like. In this way, lubricant may be forcibly fed into the cup-shaped portions of one shackle plate to lubricate the roller bearings therein and through the axial bores of the spindles or shafts 9 into the cup-shaped portions of the opposite shackle plate for lubricating the roller bearings within the cup-shaped portions of the latter shackle plate. As the nipples or connections 24 are alined with the relatively large axial bores 23 of the spindles or shafts 9, flow of the lubricant through the spindles or shafts 9 is facilitated for efficiently lubricating the bearings within the cup-shaped portions of the shackle plate 11 which is not provided with the lubricating connections or nipples. This avoids inefficient lubrication such as is had in previous constructions wherein grease cups or the like communicate with radial bores in the spindles or shafts extending outwardly from the axial bore thereof.

From the above description, it will be apparent that the device is simple, durable, and capable of being conveniently and efficiently lubricated.

What I claim as new is:

A device of the character described comprising in combination with a vehicle frame and spring having end bearings, of shafts fixed in said end bearings and having reduced ends, shackle plates at the ends of said bearings having cup-shaped end portions arranged over the reduced ends of the shafts, said cup-shaped end portions having internal shoulders spaced from the bottoms thereof, roller bearings between the reduced ends of the shafts and the cup-shaped portions of the shackle plates, each bearing comprising an inner tapered race fitted on the reduced portion of the adjacent shaft and an outer tapered race tightly fitted within and against the internal shoulder of the adjacent cup-shaped portion of the associated shackle plate, a washer closing the inner side of each cup-shaped portion and fitted on the adjacent reduced end portion of the shaft between the inner bearing race and the shoulder provided by reducing the adjacent end of the shaft, an assembly bolt passing through the intermediate portions of and connecting the shackle plates and having an angular stem portion, and an elongated outwardly curved spring plate carried by said assembly bolt and interposed between the outer side of one shackle plate and the head of said assembly bolt to yieldingly draw the shackle plates together and thereby automatically and uniformly adjust the roller bearings to compensate for wear, said spring plate and one of the shackle plates having an angular opening to engage the angular stem portion of the assembly bolt to prevent relative turning thereof, the opening of the spring plate being elongated longitudinally of the latter to prevent breaking of said spring plate when compressed toward a straight condition.

In testimony whereof I affix my signature.

RUDOLPH SCHIAVULLI.